Aug. 13, 1963  C. L. SMITH  3,100,870
ROOMS FOR TESTING ELECTRONIC EQUIPMENT
Filed May 4, 1959  3 Sheets-Sheet 1
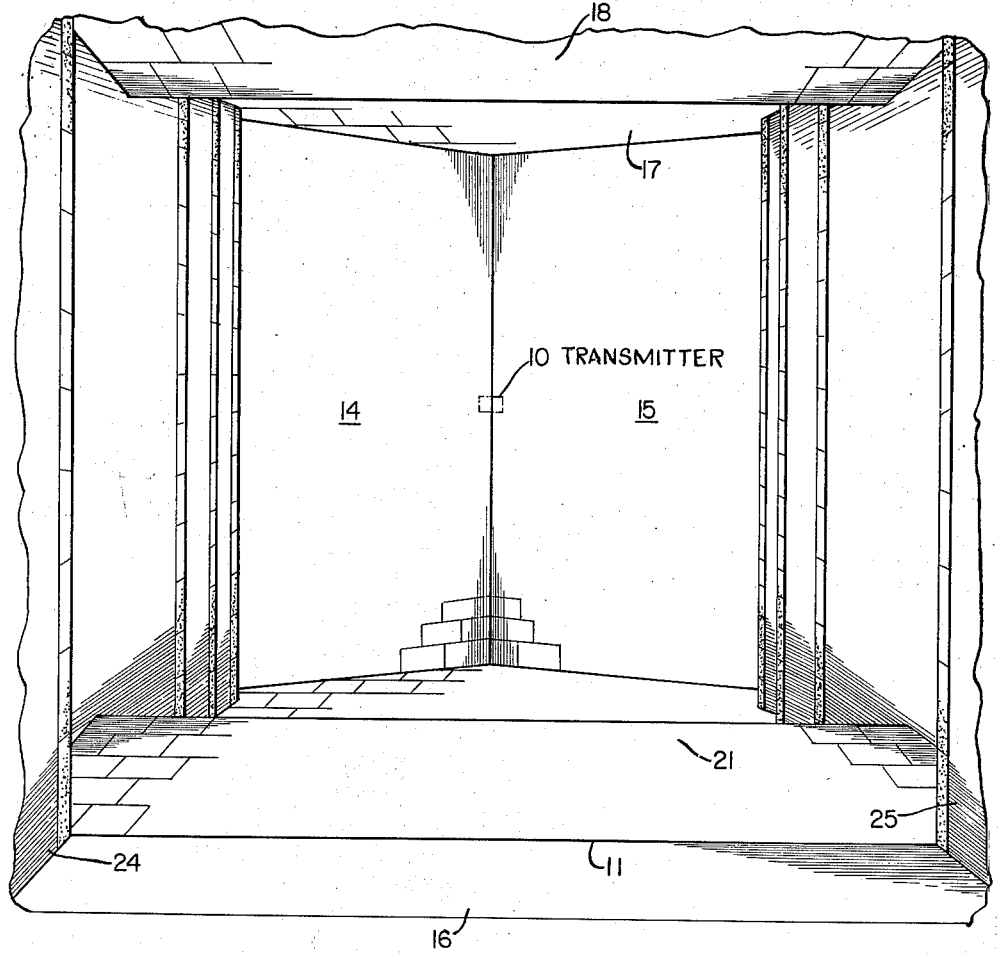
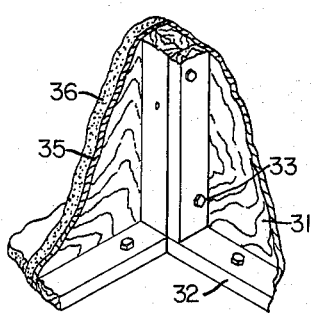
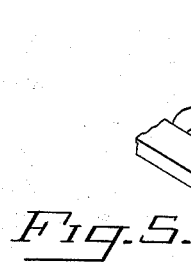
INVENTOR
CHESTER L. SMITH
BY *H. Vincent Harsha*
ATTORNEY Aug. 13, 1963 C. L. SMITH 3,100,870
ROOMS FOR TESTING ELECTRONIC EQUIPMENT
Filed May 4, 1959 3 Sheets-Sheet 2

INVENTOR
CHESTER L. SMITH

BY
ATTORNEY

Aug. 13, 1963  C. L. SMITH  3,100,870
ROOMS FOR TESTING ELECTRONIC EQUIPMENT
Filed May 4, 1959  3 Sheets-Sheet 3

INVENTOR
CHESTER L. SMITH

BY
ATTORNEY

United States Patent Office 3,100,870
Patented Aug. 13, 1963

3,100,870
ROOMS FOR TESTING ELECTRONIC EQUIPMENT
Chester L. Smith, Bedford, Mass., assignor to Raytheon Company, Lexington, Mass., a corporation of Delaware
Filed May 4, 1959, Ser. No. 810,604
5 Claims. (Cl. 325—67)

This invention relates generally to test rooms for electronic equipment and more particularly to microwave darkrooms wherein parasitic reflections which might otherwise affect the equipment under test are either eliminated or are substantially reduced.

The prior art has been concerned with the elimination of reflections in such test facilities by the use of wave traps, wall coating and certain expensive microwave absorbent wall coverings. While certain prior art arrangements have proven most effective, they do not lend themselves to mobility of use, to adaptability with diverse types of equipment under test, or to practical cost figures from a construction standpoint.

It is therefore the primary object of this invention to provide an improved and efficient microwave darkroom which overcomes the disadvantages of the prior art.

A more specific object of this invention is to provide a microwave darkroom wherein any reflections from the wall surfaces of the room are redirected back toward a transmitter whereby the receiver in the equipment under test is not subjected to such reflections.

Another object of this invention is to provide a microwave darkroom of such a geometrical design as to substantially prevent reflected energy from the room surfaces from reaching the equipment under test in the room.

A further object of this invention is to provide a microwave darkroom wherein the surfaces of the room between a transmitting antenna and a receiving antenna in the equipment under test are deformed or arranged in such a manner that any reflected energy from the walls derived from the side lobes of the transmitting antenna is redirected to the transmitting antenna.

Another object of this invention is to provide a microwave darkroom of relatively low cost as compared to the prior art.

A still further object of this invention is to provide a microwave darkroom which is of a knockdown character to render it adaptable to be readily movable to different test sites.

With the foregoing and other objects in view, the invention resides in the following specification and appended claims, certain embodiments and details of construction being illustrated in the accompanying drawings in which:

FIGURE 1 is a fragmentary interior view of the microwave darkroom of this invention viewed longitudinally of the room from a receiver position;

FIGURE 4 is a fragmentary detail in section of the indented wall joint structure at the point 4 in FIGURE 2; and FIGURE 5 is a fragmentary detail in section of the protruding wall joint structure at the point 5 in FIGURE 2.

Figure 2:
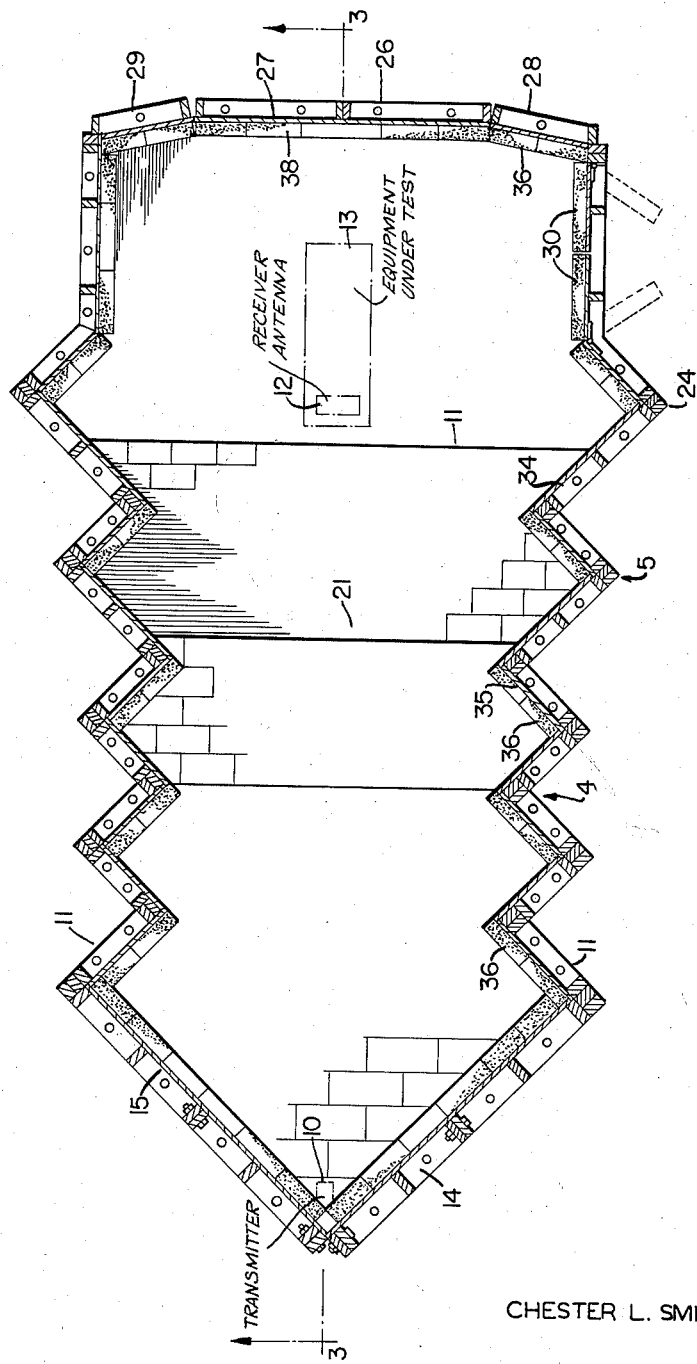
FIGURE 2 is a sectioned plan view of the microwave darkroom of this invention.

Referring more particularly to the drawings, it will be noted that a transmitting antenna 10 is mounted on the forward wall of the darkroom generally indicated at 11. The antenna 10 is connected to suitable generating equipment (not shown) to transmit energy of a certain pattern to the receiving antenna 12 contained within equipment 13 under test illustrated in box form within the room. The wall supporting the antenna 10 includes a pair of divergent sections 14 and 15, and the antenna is mounted at the joint of such sections, substantially midway between the ceiling 17 and the floor 16 of the room 11.

Figure 3:
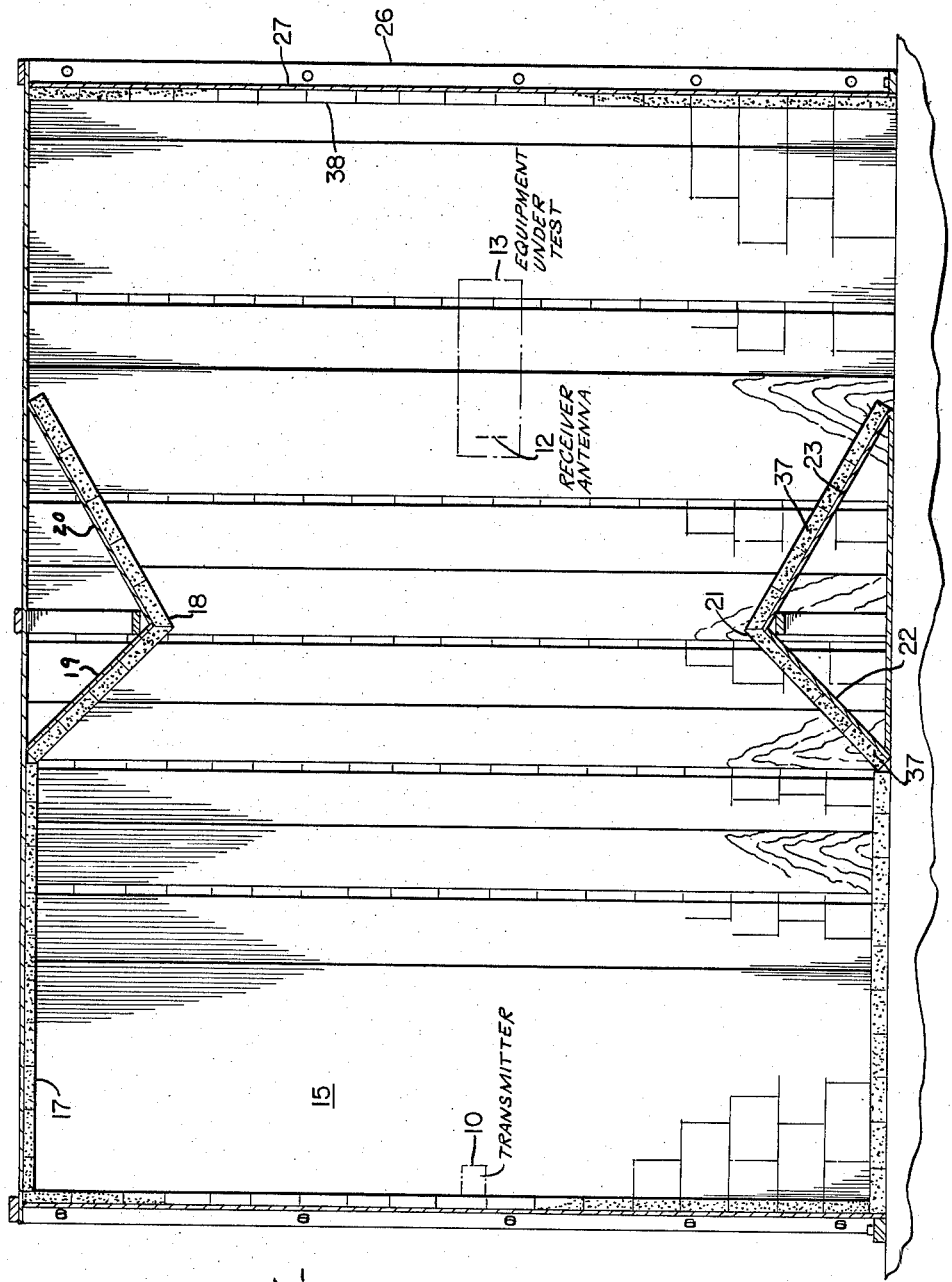
FIGURE 3 is a sectioned view in side elevation taken along the lines 3—3 of FIGURE 2.

As viewed in FIGURE 3, the ceiling 17 is provided with an inwardly directed offset section 18, including a pair of planar portions 19 and 20. Opposite to the section 18 in the floor 16 is another offset section 21, including a pair of planar portions 22 and 23. The purpose of the sections 18 and 21 will be described later in this specification.

The side walls 24 and 25 are of a general toothed or serrated form between their juncture with sections 14 and 15 of the forward wall of room 11 and with the rear wall of the room for a purpose to be described. The walls 24 and 25 connect with the rear wall 26 which includes a straight panel 27 normal to the antenna 10 and a pair of slightly angled panels 28 and 29. In wall 24 adjacent to panel 28 of the rear wall a double door 30 is provided as an access opening to the room.

The entire enclosure constituting the room 11 is of a knockdown character to render the unit readily movable and adaptable to manufacturing and test facilities. The basic simple and economic structure throughout consists of plywood panels 31 secured to two by four framing 32 as is well detailed in FIGURES 4 and 5. The plywood is secured to the framing as by nails. The individual panels formed by the framing 32 are secured by bolts 33 to adjacent panels. The size of each panel 34 forming a part of the side walls 24 or 25 as well as the number of panels and the general geometry of the room 11 is developed from a study of the type of antenna pattern originating at the transmitter antenna 10 and its relationship to the receiving antenna 12 in the equipment under test with the distance between the two antennae being of prime consideration. The geometrical configuration of all the surfaces of the room is such that any wall panel such as 35 facing the antenna 10 is situated in a plane substantially normal to the path of any energy received from the antenna. Each such facing panel 35 is covered with a layer of microwave absorbent material 36 of any well known or suitable type. The panels 35, by being normal to the path of the received energy from side lobes of the antenna pattern, reflect any energy not absorbed directly back toward the antenna 10 from whence it may be directed outwardly again to strike a panel 35 on the opposite wall of the room. By thus containing the side lobes of the radiant pattern, little or no reflected energy is permitted to reach the environment of the receiving antenna 12. The antenna 12 then receives only that portion of a transmitted signal from antenna 10 which it is supposed to receive to properly subject the equipment 13 to testing. If the reflected energy were not contained and were permitted to reach the antenna 12 then a test run of the equipment 13 might be faulty or meaningless.

The offset sections 18 and 21 in the ceiling and floor of the room are covered with a layer of microwave absorbent material 37. The sections 18 and 21 substantially prevent any reflected energy from the floor or ceiling from reaching the antenna 12. Whatever energy is not absorbed by the material 37 on panels 22 or 23 is reflected back toward the antenna 10 or away from general area of antenna 12. Thus a portion of a minor lobe of a pattern radiating from antena 10 might strike the surface of panel 22. The angle of incidence of this energy may send the reflected portion of the energy rearwardly and above the antenna 12, according to design. Upon striking the rear panel 27 or 29, which is covered with microwave absorbent material 38, more of the energy is absorbed. Any reflected portion of the remaining energy will be redirected forwardly of the room and past the equipment 13 where it will be further dissipated by the wall coverings on the angled, covered surfaces in the forward part of the room.

With this construction it is not necessary to cover the panels 34 of the toothed side walls 24 and 25 with absorbent material, thereby reducing the cost of construction considerably over prior art rooms wherein the entire interiors were covered. Likewise it is not necessary to cover the ceiling or floor of the room 11 rearwardly of the receiving antenna.

It should therefore be apparent to one skilled in the art that the geometrical design of all of the surfaces of the room is such as to direct any unwanted reflected energy originating at the antenna 10 away from the receiving antenna 12. In addition to the geometrical features the structure provides that certain of the wall surfaces are covered with absorbent material so that the energy level of any reflected portion of a wave is decreased with each reflection until complete dissipation is achieved. Thus the invention does not rely solely on the material used for absorbing microwave energy, or upon complex designs or arrangements of such material, but merely on flat panels of such material with partial reflections in directions away from the receiving antenna 12 on the equipment 13 under test.

The exact geometrical design of the room is calculated in accord with the type of antenna used for transmitting and receiving, the equipment under test and the required spacing between these elements to achieve a proper test. It will be obvious to one skilled in the art therefore that the character of the room as to shapes, sizes and details of construction may vary under certain conditions and requirements, all such variations being well within the purview of this invention and the appended claims.

I claim:

1. A microwave darkroom for testing electronic equipment by the transmission of radiant energy between transmitting and receiving antennae spaced apart in said room which comprises, a pair of toothed side wall surfaces spaced equally to either side of a line between the transmitting and receiving antenna, ceiling and floor surfaces having spaced, facing inwardly, offset sections located at a predetermined position intermediate the spacing between the transmitting and receiving antennae, and front and rear wall surfaces for said room, all said room defining surfaces being so geometrically arranged relative to the transmitting antenna as to reflect any energy received from the transmitting antenna away from the receiving antenna and toward another room surface located on a different wall.

2. The invention according to claim 1 wherein said reflecting room surfaces are covered with microwave absorbent material.

3. A microwave darkroom for testing electronic equipment by the transmission of radiant energy between transmitting and receiving antennae spaced apart in said room which comprises a pair of side walls, said side walls being of toothed form over their length with each toothed portion thereof having a flat panel mounted in a plane normal to the propagation axis of energy received from the transmitting antenna, a ceiling for the room, a floor for the room, said ceiling and floor including facing, inwardly offset sections located at a predetermined position intermediate the spacing between the transmitting and receiving antennae, a front wall having rearwardly diverging panels joining with the side walls, and a rear wall connected with said side walls to complete the enclosure, the geometry of said walls and panels being so calculated relative to the position of the transmitting antenna as to reflect any energy received from the transmitting antenna away from the environment of the receiving antenna and toward another room surface.

4. The invention according to claim 3 wherein said reflecting panels and walls are covered with microwave absorbent material.

5. The invention according to claim 3 wherein portions of the ceiling and floor including the offset sections, the normally positioned panels of the side walls, and the front and rear walls of the room are covered with microwave absorbent material.

References Cited in the file of this patent

UNITED STATES PATENTS

| 2,594,971 | Moullin | Apr. 29, 1952 |
| 2,599,944 | Salisbury | June 10, 1952 |
| 2,656,535 | Neher | Oct. 20, 1953 |
| 2,870,439 | Stinehelfer | Jan. 20, 1959 |

OTHER REFERENCES

"Design and Build an Anechoic Chamber," Electronic Industries, April 1959, pp. 72–76.